United States Patent
Guilani (10) Patent No.: US 11,440,767 B2
(45) Date of Patent: Sep. 13, 2022

(54) DYNAMIC ASSIGNMENT OF SELECTION BUTTONS ON A DESTINATION ENTRY SYSTEM OF AN ELEVATOR

(71) Applicant: Otis Elevator Company, Farmington, CT (US)

(72) Inventor: Brad Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1080 days.

(21) Appl. No.: 16/048,840

(22) Filed: Jul. 30, 2018

(65) Prior Publication Data
US 2020/0031614 A1   Jan. 30, 2020

(51) Int. Cl.
*B66B 1/34* (2006.01)
*B66B 1/46* (2006.01)
*G06F 7/76* (2006.01)
*B66B 1/14* (2006.01)
*G06F 3/04886* (2022.01)

(52) U.S. Cl.
CPC .............. *B66B 1/3407* (2013.01); *B66B 1/14* (2013.01); *B66B 1/3461* (2013.01); *B66B 1/468* (2013.01); *G06F 3/04886* (2013.01); *B66B 2201/103* (2013.01); *B66B 2201/4653* (2013.01)

(58) Field of Classification Search
CPC ..... B66B 3/002; B66B 1/3407; B66B 1/3423; B66B 1/463; B66B 1/461
See application file for complete search history.

(56) References Cited

U.S. PATENT DOCUMENTS

| | | |
|---|---|---|
| 7,194,239 B2 | 3/2007 | Mantyjarvi et al. |
| 7,398,865 B2 | 7/2008 | Felder et al. |
| 7,692,629 B2 | 4/2010 | Baudisch et al. |
| 7,958,971 B2 | 6/2011 | Mangini et al. |
| 8,125,461 B2 | 2/2012 | Weber et al. |
| 8,136,636 B2 | 3/2012 | Bahjat et al. |
| 8,704,643 B2 * | 4/2014 | Bates .................. G08C 23/04 340/12.22 |
| 8,706,504 B2 | 4/2014 | Gazdzinski |
| 8,800,026 B2 * | 8/2014 | Tamaki .................. G06F 21/44 726/16 |
| 8,959,441 B2 | 2/2015 | Fermon |
| 9,041,654 B2 | 5/2015 | Ellard |
| 9,110,590 B2 | 8/2015 | Marsden et al. |
| 9,400,599 B2 * | 7/2016 | Park .................. G06F 3/0486 |
| 9,448,724 B2 | 9/2016 | Arnold |
| 9,561,931 B2 * | 2/2017 | Kauppinen ............. B66B 1/468 |

(Continued)

FOREIGN PATENT DOCUMENTS

JP   2016055969 A   4/2016
KR   20150121807 A   10/2015

*Primary Examiner* — Christopher Uhlir
(74) *Attorney, Agent, or Firm* — Cantor Colburn LLP (57) ABSTRACT

A system for dynamic assignment of buttons on destination entry terminals (DETs) is provided. The system performs operations that include identifying a message for display on a touchscreen display of a destination entry system of an elevator. The message includes a selection button for display on the touchscreen display. The at least one selection button is displayed at a first location on the touchscreen display. The at least one selection button is displayed at a different location on the touchscreen display once a rearrangement criterion is satisfied.

20 Claims, 5 Drawing Sheets

(56) References Cited

U.S. PATENT DOCUMENTS

| | | |
|---|---|---|
| 2015/0246790 A1 | 9/2015 | Hiltunen et al. |
| 2016/0096706 A1 | 4/2016 | Tang |
| 2017/0177158 A1* | 6/2017 | Tu .................... G06F 3/0446 |
| 2017/0235482 A1 | 8/2017 | Ferren |
| 2018/0088761 A1 | 3/2018 | Schobel et al. |

* cited by examiner

DYNAMIC ASSIGNMENT OF SELECTION BUTTONS ON A DESTINATION ENTRY SYSTEM OF AN ELEVATOR

BACKGROUND

The subject matter disclosed herein relates to the field of elevator destination entry systems, and more particularly relates to dynamic assignment of selection buttons on a touchscreen display of a destination entry system of an elevator.

Buildings that have a large number of floors and elevator banks can use destination management software, such as CompassPlus™ from Otis Elevator Company, to direct passengers to a particular elevator car(s). CompassPlus groups passengers and stops, and assigns an elevator car to a group of passengers heading for the same place or series of floors, or zones. Passengers enter their floor destinations in a keypad or touchscreen display of a free-standing destination entry terminal (DET), in a wall-mounted hallway fixture, or on a mobile device, and the destination management software suggests an elevator and provides directions to the elevator.

When the same location of the touchscreen display of a destination entry system is pressed by users repeatedly, the touchscreen display interface may develop a dead spot and/or surface damage and therefore fail, necessitating the replacement of the touchscreen display interface.

BRIEF SUMMARY

According to an embodiment, a system configured to perform dynamic assignment of selection buttons on a destination entry system of an elevator is provided. The system includes a processor and a memory including computer-executable instructions that, when executed by the processor, cause the processor to perform operations. The operations include identifying a message for display on a touchscreen display of a destination entry system of an elevator. The message includes a selection button for display on the touchscreen display. The at least one selection button is displayed at a first location on the touchscreen display. The at least one selection button is displayed at a different location on the touchscreen display once a rearrangement criterion is satisfied.

In addition to one or more of the features described herein, or as an alternative, further embodiments of the system may include that the destination entry system of an elevator determining whether the rearrangement criterion is satisfied.

In addition to one or more of the features described herein, or as an alternative, further embodiments of the system may include that a controller of the destination entry system of an elevator determines whether the rearrangement criterion is satisfied.

In addition to one or more of the features described herein, or as an alternative, further embodiments of the system may include that it is determined on a period basis whether the rearrangement criterion is satisfied.

In addition to one or more of the features described herein, or as an alternative, further embodiments of the system may include that the rearrangement criterion is satisfied based at least in part on the at least one selection button being selected a threshold number of times at the first location.

In addition to one or more of the features described herein, or as an alternative, further embodiments of the system may include that the rearrangement criterion is satisfied based at least in part on an estimated number of times that the at least one selection button is selected at the first location being over a threshold number.

In addition to one or more of the features described herein, or as an alternative, further embodiments of the system may include that the destination entry system is one of a free-standing device entry terminal (DET) and a wall mounted hallway fixture.

In addition to one or more of the features described herein, or as an alternative, further embodiments of the system may include that the destination entry system is an elevator car operating panel (COP) inside an elevator car.

In addition to one or more of the features described herein, or as an alternative, further embodiments of the system may include that the at least one selection button includes a graphic that indicates a floor of a building.

In addition to one or more of the features described herein, or as an alternative, further embodiments of the system may include that the message further includes a second selection button that is displayed at a second location on the touchscreen display prior to the rearrangement criterion being satisfied and at a third location on the touchscreen display subsequent to the rearrangement criterion being satisfied.

According to an embodiment, a method of performing dynamic assignment of selection buttons on a destination entry system of an elevator is provided. The method includes identifying a message for display on a touchscreen display of a destination entry system of an elevator. The message includes a selection button for display on the touchscreen display. The at least one selection button is displayed at a first location on the touchscreen display. The at least one selection button is displayed at a different location on the touchscreen display once a rearrangement criterion is satisfied.

In addition to one or more of the features described herein, or as an alternative, further embodiments of the method may include that the destination entry system of an elevator determining whether the rearrangement criterion is satisfied.

In addition to one or more of the features described herein, or as an alternative, further embodiments of the method may include that a controller of the destination entry system of an elevator determines whether the rearrangement criterion is satisfied.

In addition to one or more of the features described herein, or as an alternative, further embodiments of the method may include that it is determined on a period basis whether the rearrangement criterion is satisfied.

In addition to one or more of the features described herein, or as an alternative, further embodiments of the method may include that the rearrangement criterion is satisfied based at least in part on the at least one selection button being selected a threshold number of times at the first location.

In addition to one or more of the features described herein, or as an alternative, further embodiments of the method may include that the rearrangement criterion is satisfied based at least in part on an estimated number of times that the at least one selection button is selected at the first location being over a threshold number.

In addition to one or more of the features described herein, or as an alternative, further embodiments of the method may include that the destination entry system is one of a free-standing device entry terminal (DET) and a wall mounted hallway fixture.

In addition to one or more of the features described herein, or as an alternative, further embodiments of the method may include that the destination entry system is an elevator car operating panel (COP) inside an elevator car.

In addition to one or more of the features described herein, or as an alternative, further embodiments of the method may include that the at least one selection button includes a graphic that indicates a floor of a building.

In addition to one or more of the features described herein, or as an alternative, further embodiments of the method may include that the message further includes a second selection button that is displayed at a second location on the touchscreen display prior to the rearrangement criterion being satisfied and at a third location on the touchscreen display subsequent to the rearrangement criterion being satisfied.

Technical effects of embodiments of the present disclosure include the ability to prolong touchscreen display life by changing the location of selection buttons so that the same location on a touchscreen display is not pressed repeatedly by users. Prolonging touchscreen display life can result in cost savings by not having to replace touchscreen displays as often. In accordance with embodiments described herein, the life of the touchscreen display can be prolonged without adding any additional cost to the touchscreen display or destination entry system operation.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

One or more embodiments of the present disclosure provide for dynamic assignment of selection buttons on a touchscreen display of a destination entry system of an elevator. Destination entry systems can include wall-mounted hallway fixtures, free-standing destination entry terminals (DETs), and elevator car operating panels (COPs) inside an elevator car. In a destination entry system, a selection button on a touchscreen display corresponding to a particular floor location in a building can be selected as infrequently as a few times a day or up to several hundred (or more) times a day, depending on the number of floors in the building and the amount of traffic in the building. Pressing the same location(s) over and over may lead to a dead spot(s) on the touchscreen display and require the touchscreen display to be replaced so that the destination entry system can properly operate.

One or more embodiments of the present invention may extend the lifespan of the touchscreen display by varying the location of the floor selection buttons (and other frequently pressed buttons) that are presented to a user on a destination entry terminal. Varying the location may lessen the number of times that the same location on the touchscreen display is pressed and prolong the amount of time before any dead spots and/or surface damage occur on the touchscreen display. As used herein, the term "selection button" refers to a graphic representation on a touchscreen display that is presented to the user for selection. The selection button can take on any shape or graphic on the touchscreen display.

Figure 1:
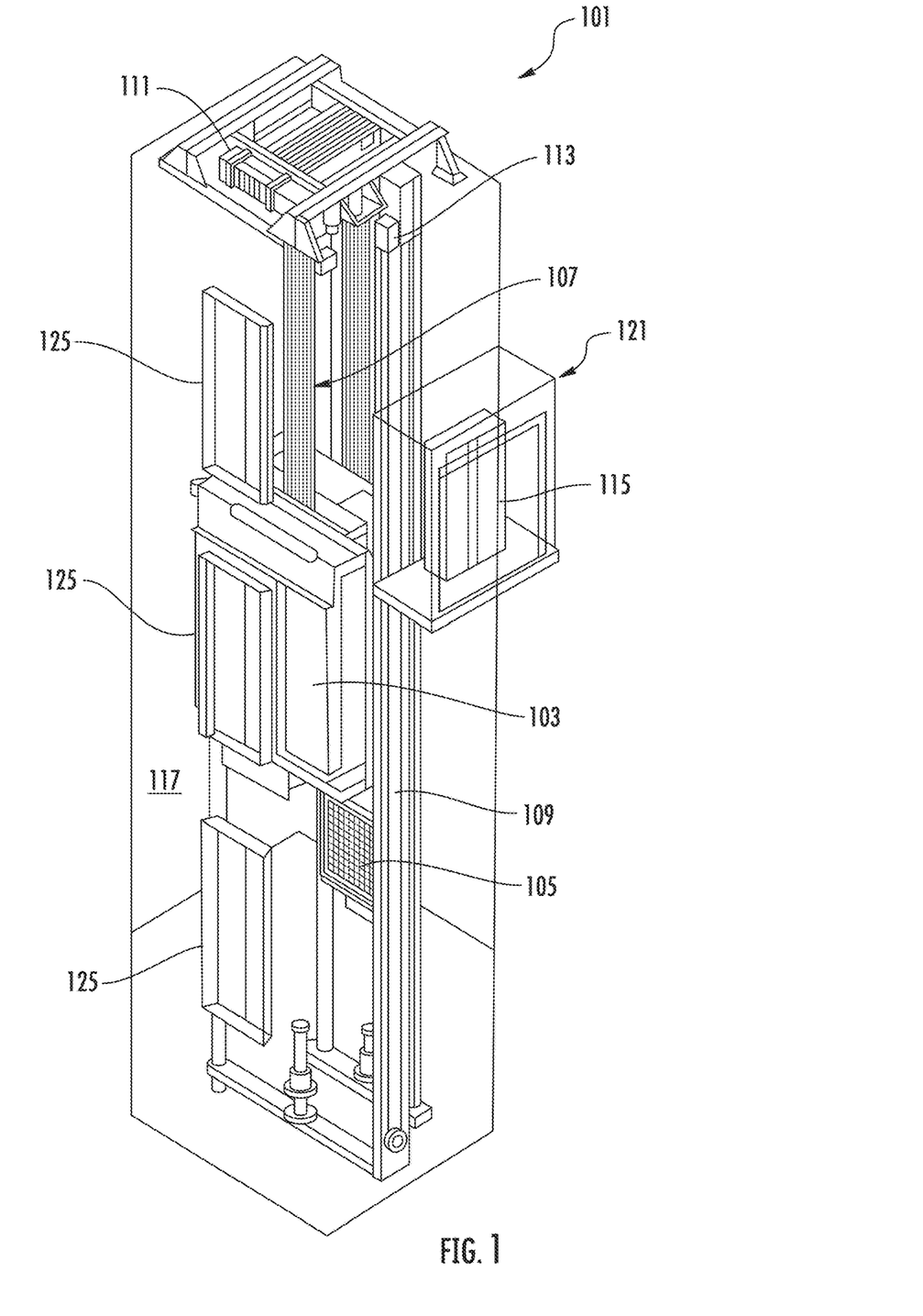
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115.

Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
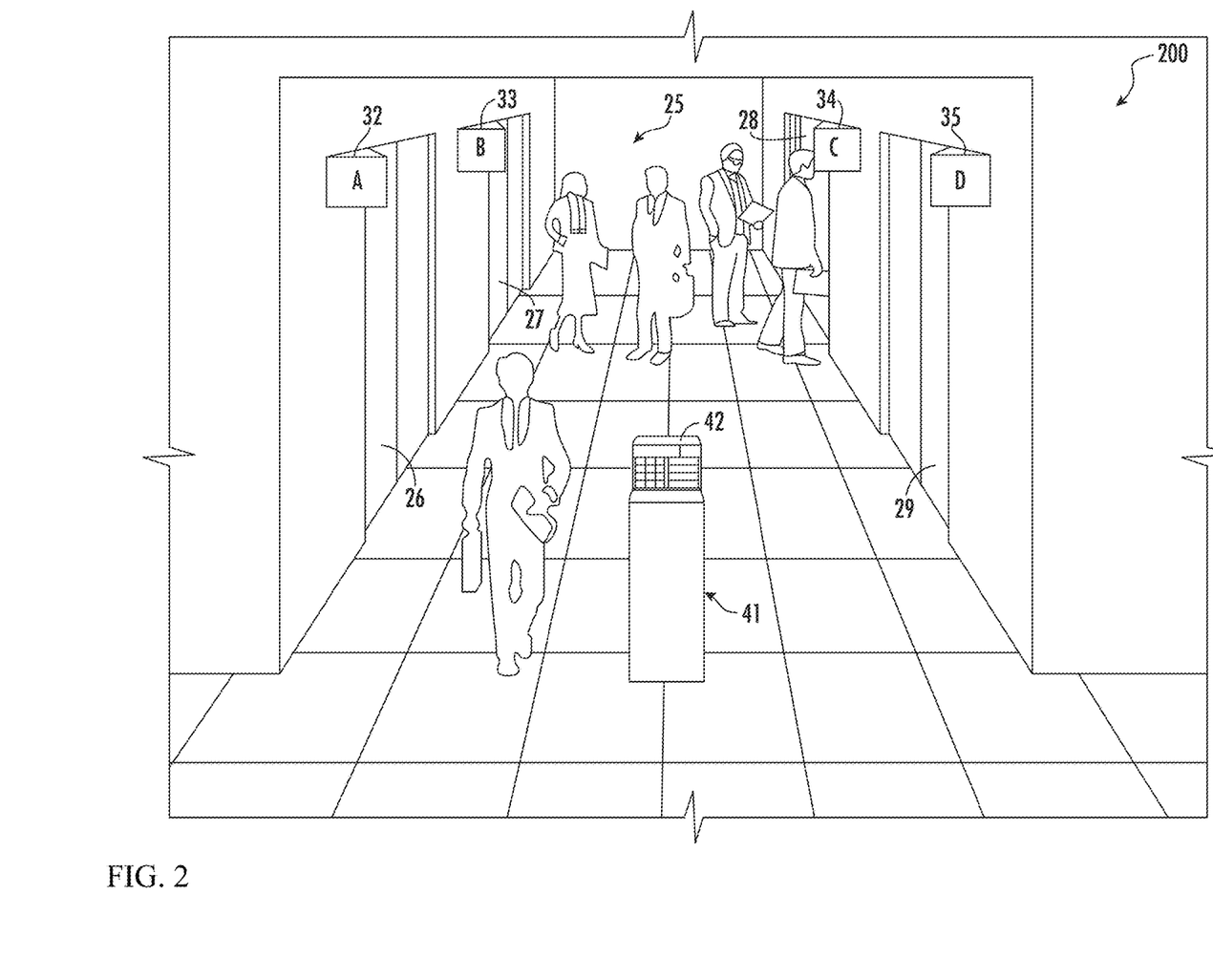
FIG. 2 is a simplified perspective of an elevator lobby having a destination entry terminal (DET) kiosk having an adaptable touchscreen display in accordance with one or more embodiments of the present disclosure.

Turning now to FIG. 2, a simplified perspective of an elevator lobby 200 having a destination entry system, DET 41 with an adaptable touchscreen display 42 is generally shown in accordance with one or more embodiments of the present disclosure. As shown in FIG. 2, an elevator lobby 25 includes a plurality of elevators 26 27 28 29, each having an elevator indicator 32 33 34 34 disposed adjacent thereto which is capable of illuminating to indicate the presence, or impending presence, of the related elevator.

Figure 3:
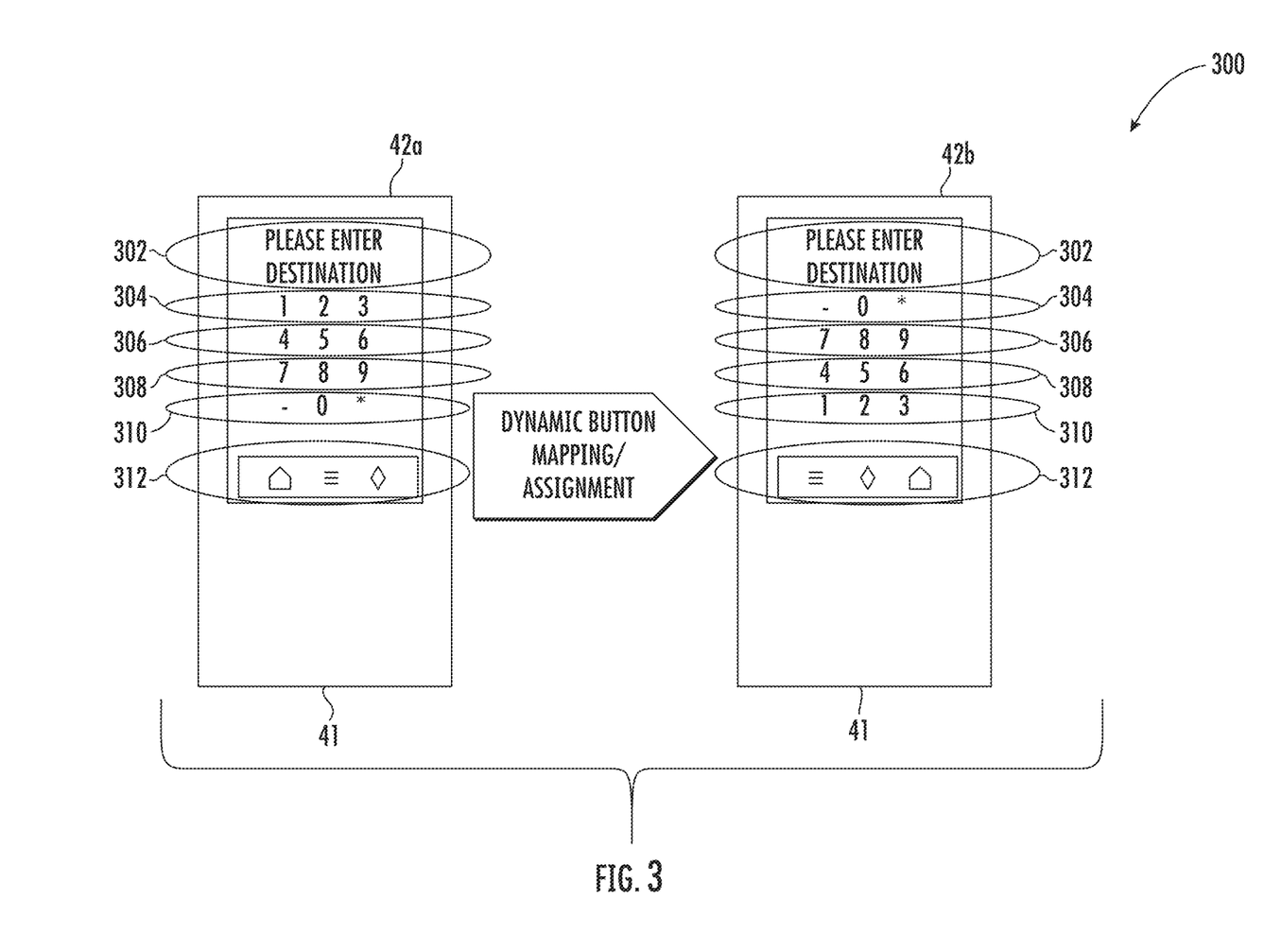
FIG. 3 is a block diagram of a message being displayed on the touchscreen display of the DET of FIG. 2 in accordance with one or more embodiments of the present disclosure.

Turning now to FIG. 3, a block diagram 300 of a message being displayed on the touchscreen display 42 of the DET 41 of FIG. 2 is generally shown in accordance with one or more embodiments of the present disclosure. Display screen version one 42a shows a message related to selecting a target floor destination being arranged in one manner and display screen version two 42b shows the same message displayed in another manner. The text "Please Enter Destination" is displayed in location 302 in both display screen version one 42a and display screen version two 42b (in another embodiment, not shown, the text displayed in location 302 can be moved to another location). The portion of the message that contains floor election buttons "1 2 3" is at location 304 in display screen version one 42a and at location 310 in display screen version two 42b. This movement can avoid wear and damage on one location of the touchscreen display, for example, selection button "1" if floor one is selected more often than other selection buttons.

In the embodiment shown in FIG. 3, all of the floor number selection buttons are moved to different locations. The portion of the message that contains floor selection buttons "4 5 6" is at location 306 in display screen version one 42a and at location 308 in display screen version two 42b; the portion of the message that contains floor selection buttons "7 8 9" is at location 308 in display screen version one 42a and at location 306 in display screen version two 42b; and the portion of the message that contains selection buttons "- 0*" is at location 310 in display screen version one 42a and at location 304 in display screen version two 42b. In addition, location 312 contains the same navigation selection buttons but they have been rearranged. The contents of location 312 in display screen version one 42a includes navigation selection buttons ordered as "△ ◇ ≡" and the contents of location 312 in display screen version two 42b contains the same selection buttons but displayed in a different order "≡ ◇ △".

FIG. 3 shows just one example of how contents of the touch screen display 42 can be modified. In other embodiments, the columns can be switched so that for example, the positions of selection buttons "1 4 7 -" in display screen version one 42a can be swapped with the positions of "3 6 9*". In other embodiments, only a subset of the selection buttons are moved based on, for example on the actual or predicted amount of times that a particular selection button is selected. In further embodiments the positions of the selection buttons are shifted slightly in a horizontal or vertical direction. For example, the selection button "1" can be moved to a new position that is in between were selection button "1" and selection button "2" are in display screen version one 42a. It is to be appreciated that the allowable rearrangement of the buttons shall meet local elevator codes and that not all re-arrangements, such as swapping of columns and rows described above, may be permissible by the local elevator code.

Figure 4:
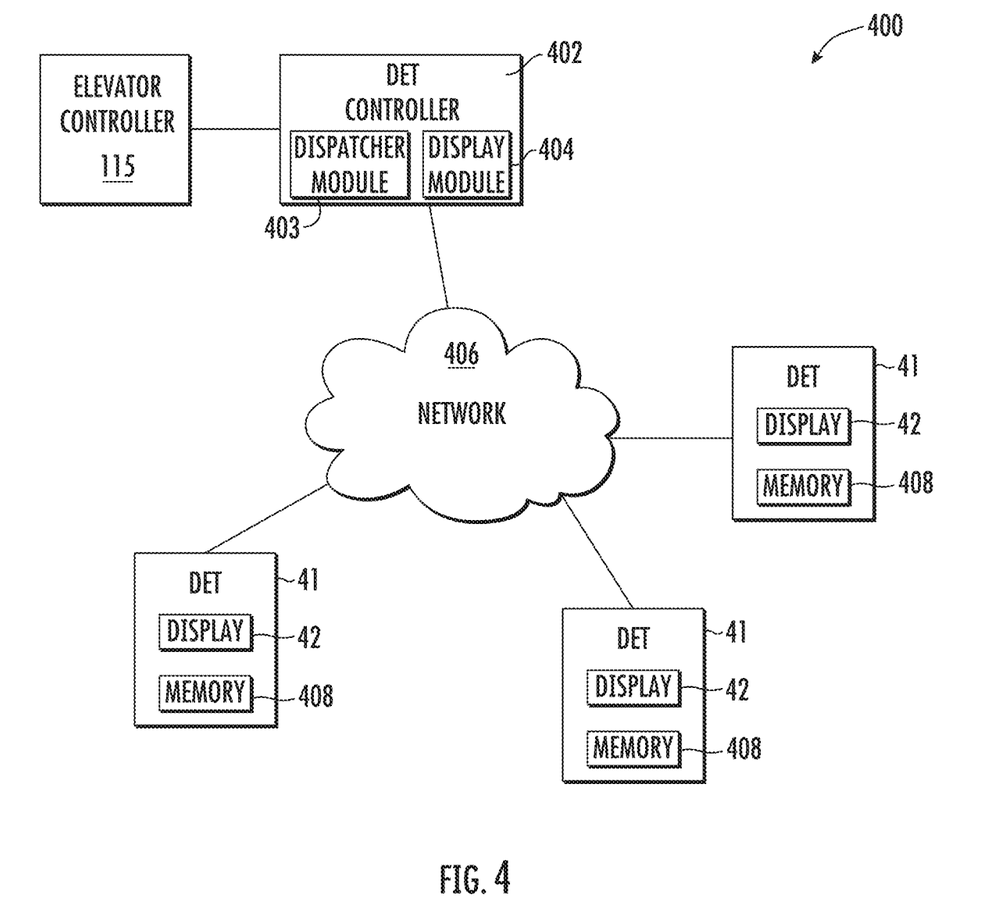
FIG. 4 is a schematic illustration of system for dynamic assignment of selection buttons on a destination entry system of an elevator in accordance with one or more embodiments of the present disclosure.

Turning now to FIG. 4, a schematic illustration of system 400 for dynamic assignment of buttons on DETs is generally shown in accordance with one or more embodiments of the present disclosure. The system 400 shown in FIG. 4 includes elevator controller 115, DET controller 402, DETs 41, and network 406. In an embodiment, the DET controller 402 is in communication with elevator controller 115 via a communication interface that may be implemented by any short or long-range wired or wireless communication method known in the art over networks such as, but not limited to the Internet, a local area network (LAN), and a wide area network (WAN). In an embodiment, the DET controller 402 communicates the input received from the DETs 41 regarding requested floors to the elevator controller 115.

The DET controller 402 may incorporate the destination entry dispatcher module 403 in addition to its DET management modules. The dispatcher module 403 contains hardware and software components necessary to communicate with individual elevator controller 115 to move the elevator car 103 up or down to the floor of the building as assigned by the DET controller. It is to be appreciated that in group of elevators shown in the embodiment in FIG. 2, each elevator 26 27 28 29 has an operational controller 115 and that the dispatcher module 403 communicates with all individual controllers in the group of elevators. In an alternate embodiment, each elevator has its own controller. The DET controller 402 shown in FIG. 4 includes a display module 404 containing software instructions for performing all or a subset of the dynamic selection button mapping/assignment processing described herein. In alternate embodiment, each DET 41 includes a display module, such as display module 404, for performing all or a subset of the dynamic selection button mapping/assignment processing described here. The instructions can be stored in a memory on the DET controller 402 and may include one or more separate programs, each of which comprises an ordered listing of executable instructions. As shown in FIG. 4, the DET controller 402 is in communication with a plurality of DETs 41 via network 406. In an embodiment, the DETs 41 act as slave devices to the DET controller 402 which controls the messages to be displayed and the locations of content (e.g., selection buttons) of the messages on the displays 42 of the DETs 41. In another embodiment, each DET 41 receives messages to be displayed from the DET controller 402 and performs local processing to determine the locations of content of the messages on the touchscreen display 42 of the DET 41. Inputs received at the DETs 41, via the touchscreen displays 42 are sent to the DET controller 402.

The DET controller 402 can include a hardware device, such as a processor for executing the display module 404, that can include hardware instructions and/or software instructions. The processor may be a custom made or commercially available processor, a central processing unit (CPU), an auxiliary processor among several processors, a semiconductor based microprocessor (in the form of a microchip or chip set), a macroprocessor, or other device for executing instructions.

As shown in FIG. 4, the DETs 41 include memory 408 and touchscreen displays 42. In embodiment, where a DET 41 acts as a slave device, the memory 408 can store the messages to be displayed on the touchscreen display 42 including the location to display content of each message on the touchscreen display 42. The touchscreen display can be implemented by any touchscreen display technology known in the art such as, but not limited to resistive touchscreen panels, and capacitive touchscreen panels. In an embodiment, where a DET 41 performs local processing to determine a location of contents of each message, the memory 408 also stores computer instructions for dynamic selection button mapping/assignment. The processing of the DET 41 can be performed by a hardware device, such as a processor, for executing hardware instructions or software, particularly those stored in memory 408. The processor may be a custom made or commercially available processor, a central processing unit (CPU), an auxiliary processor among several processors, a semiconductor based microprocessor (in the form of a microchip or chip set), a macroprocessor, or other device for executing instructions.

The memory 408 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Note that the memory 408 may have a distributed architecture, where various components are situated remote from one another but may be accessed by the processor of the DET 41. The instructions in memory 408 may include one or more separate programs, each of which comprises an ordered listing of executable instructions for implementing logical functions.

The network 406 shown in FIG. 4 may be an IP-based network for communication between the DET controller 402 and the DETs 41. The network 406 transmits and receives data between the DET controller 402 and the DETs 41. In some embodiments, the network 406 may be a managed IP network administered by a service provider. The network 406 may be implemented in a wired or wireless fashion, e.g., using wireless protocols and technologies, such as WiFi, WiMax, etc. The network 406 may also be a packet-switched network such as a local area network, wide area network, metropolitan area network, the Internet, or other similar type of network environment. The network 406 may be a fixed wireless network, a wireless local area network (LAN), a wireless wide area network (WAN) a personal area network (PAN), a virtual private network (VPN), intranet or other suitable network system and may include equipment for receiving and transmitting signals.

Although the DET controller 402 is depicted herein as a single device, it should be appreciated that the DET controller 402 may alternatively be embodied as a multiplicity of systems. It should be appreciated that, although particular elements are separately defined in the schematic block diagram of FIG. 4, each or any of the elements may be otherwise combined or separated via hardware and/or software.

Figure 5:
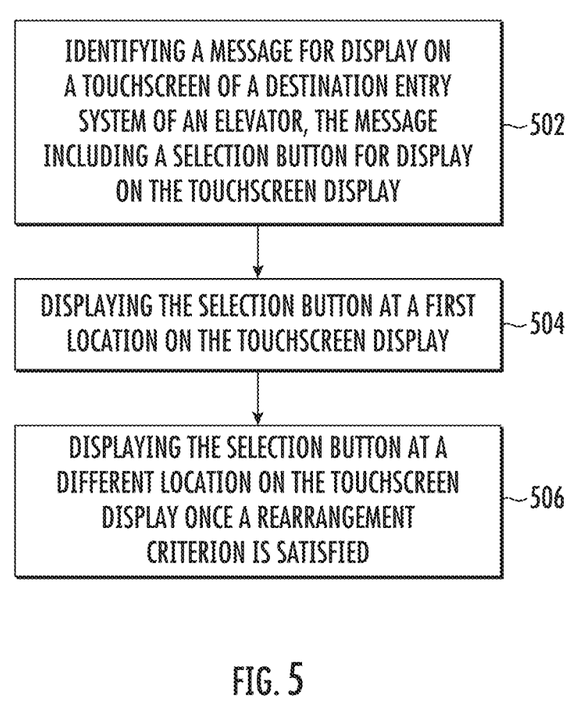
FIG. 5 is a flow diagram illustrating a method of dynamic assignment of selection buttons on a destination entry system of an elevator in accordance with one or more embodiments of the present disclosure.

Turning now to FIG. 5, a flow diagram 500 illustrating a method of dynamic assignment of selection buttons on a destination entry system of an elevator is generally shown in accordance with one or more embodiments of the present disclosure. In an embodiment, the mapping and reassignment can be performed by software instructions located in a controller of a destination entry system, such as DET controller 402 of FIG. 4, and/or software instructions located at the destination entry system, such as DET 41 of FIG. 4.

At block 502 of FIG. 5, a message for display on a touchscreen display, such as touchscreen display 42 of FIG. 4, of a destination entry system of an elevator is identified. The message can include a selection button for display at a first location on the touchscreen display. The selection buttons displayed on the screen of DET 41 include alpha-numeric characters as well as symbols are arranged on the display of DET 41 according to a location mapping protocol such as A17.1 which specifies that the numerical arrangement must be the same as a phone keypad.

At block 504, the selection button is displayed at the first location on the touchscreen display. At block 506 the selection button is displayed at a different location (i.e., different than the first location) on the touchscreen display once a rearrangement criterion satisfied. In an embodiment, rearrangement criterion is based at least in part on a passage of time and the rearrangement criterion is met when a specified amount of time has passed (e.g., a day, an hour, a week, etc.). In this manner, the rearrangement criterion is met on a periodic basis.

In another embodiment, rearrangement criterion is based at least in part on a number of times that the selection button is selected. In this embodiment, the controller of the destination entry system (when the mapping/assignment processing is performed on the controller) or the destination entry system (when the mapping/assignment processing is performed on the device entry system) keeps a count of how many times the selection button is pressed. The count is compared to a threshold number to determine whether the location of the selection button on the touchscreen display should be changed, that is, whether the rearrangement criterion has been met. The threshold number can be programmable based for example, on a type of touchscreen display on the destination entry system. In this embodiment, a number of times that each location on a touchscreen display is pressed can be tracked for the lifetime of the touchscreen display. Decisions about where to map content that includes a selection button can be made based on this data as well as how many times each selection is chosen. For example, the selection for floor two may be moved to a location on the touchscreen display that has been pressed a small time of times because in the past floor two has been selected a large number of times, while the selection for floor seventeen may be moved on the touchscreen display that has been pressed a moderate number of times because in the past floor seventeen has been selected a relatively small number of times. This balancing of expected future selection with past wear on the touchscreen display can be used to prolong the lifespan of the touchscreen display.

In another embodiment, the target location is changed (the rearrangement criterion is met) based at least in part on an estimate of how many times the selection button has been being selected. The estimate can be based on historical data and/or statistical data.

In an embodiment, a customer can customize the rearrangement criterion, including the method for changing and the frequency, as well as where to map content on the display.

The processing of FIG. 5 can include monitoring all or a subset of the selection buttons presented to a user of the destination entry system. Selection buttons can be relocated individually or as groups. For example, the selection button for floor one can be moved to a different location periodically or in response to usage. If could be swapped with a location of a less often used selection button or it could be moved to a location that currently does not contain a selection button.

In an embodiment, the processing shown in FIG. 5 is performed by a destination entry system, such as DET 41 of FIG. 4. In another embodiment, the processing shown in FIG. 5 is performed by a controller of a destination entry system, such as DET controller 402 of FIG. 4.

Though embodiments have been described herein in terms of free-standing DETs, embodiments are not limited to DETs and can include any destination entry systems known in the art such as, but not limited a free-standing DET, a wall mounted hallway fixture, and/or an elevator car operating panel (COP).

While the above description has described the flow of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/ or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system configured to dynamically assign selection buttons on touchscreen displays, the system comprising:
   a processor; and
   a memory comprising computer-executable instructions that, when executed by the processor, cause the processor to perform operations, the operations comprising:
      identifying a message for display on a touchscreen display of a destination entry system of an elevator, the message comprising at least one selection button for display on the touchscreen display;
      displaying the at least one selection button at a first location on the touchscreen display; and
      displaying the at least one selection button at a different location on the touchscreen display once a rearrangement criterion is satisfied,
      wherein the rearrangement criterion includes a frequency of usage of the at least one selection button, and the different location can be any location on the touchscreen display.

2. The system of claim 1, wherein the destination entry system of an elevator determines whether the rearrangement criterion is satisfied.

3. The system of claim 1, wherein a controller of the destination entry system of an elevator determines whether the rearrangement criterion is satisfied.

4. The system of claim 1, wherein it is determined on a periodic basis whether the rearrangement criterion is satisfied.

5. The system of claim 1, wherein the rearrangement criterion is satisfied based at least in part on the at least one selection button being selected a threshold number of times at the first location.

6. The system of claim 1, wherein the rearrangement criterion is satisfied based at least in part on an estimated number of times that the at least one selection button is selected at the first location being over a threshold number.

7. The system of claim 1, wherein the destination entry system is one of a free-standing device entry terminal (DET) and a wall mounted hallway fixture.

8. The system of claim 1, wherein the destination entry system is an elevator car operating panel (COP) inside an elevator car.

9. The system of claim 1, wherein the at least one selection button comprises a graphic that indicates a floor of a building.

10. The system of claim 1, wherein the message further comprises a second selection button that is displayed at a second location on the touchscreen display prior to the rearrangement criterion being satisfied and at a third location on the touchscreen display subsequent to the rearrangement criterion being satisfied.

11. A method of dynamically assigning selection buttons on touchscreen displays, the method comprising:
    identifying a message for display on a touchscreen display of a destination entry system of an elevator, the message comprising at least one selection button for display on the touchscreen display;
    displaying the at least one selection button at a first location on the touchscreen display; and
    displaying the at least one selection button at a different location on the touchscreen display once a rearrangement criterion is satisfied,
    wherein the rearrangement criterion includes a frequency of usage of the at least one selection button, and the different location can be any location on the touchscreen display.

12. The method of claim 11, wherein the destination entry system of an elevator determines whether the rearrangement criterion is satisfied.

13. The method of claim 11, wherein a controller of the destination entry system of an elevator determines whether the rearrangement criterion is satisfied.

14. The method of claim 11, wherein it is determined on a periodic basis whether the rearrangement criterion is satisfied.

15. The method of claim 11, wherein the rearrangement criterion is satisfied based at least in part on the at least one selection button being selected a threshold number of times at the first location.

16. The method of claim 11, wherein the rearrangement criterion is satisfied based at least in part on an estimated number of times that the at least one selection button is selected at the first location being over a threshold number.

17. The method of claim 11, wherein the destination entry system is one of a free-standing device entry terminal (DET) and a wall mounted hallway fixture.

18. The method of claim 11, wherein the destination entry system is an elevator car operating panel (COP) inside an elevator car.

19. The method of claim 11, wherein the at least one selection button comprises a graphic that indicates a floor of a building.

20. The method of claim 11, wherein the message further comprises a second selection button that is displayed at a second location on the touchscreen display prior to the rearrangement criterion being satisfied and at a third location on the touchscreen display subsequent to the rearrangement criterion being satisfied.

* * * * *